(12) United States Patent
Bentley et al.

(10) Patent No.: US 8,924,243 B2
(45) Date of Patent: Dec. 30, 2014

(54) MITIGATING PEAK TRAFFIC TIMES IN A MULTIMEDIA CONFERENCE

(71) Applicant: Avaya Inc., Basking Ridge, NJ (US)

(72) Inventors: Jon Louis Bentley, New Providence, NJ (US); Parameshwaran Krishnan, Basking Ridge, NJ (US); Peter Tarle, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 288 days.

(21) Appl. No.: 13/630,692

(22) Filed: Sep. 28, 2012

(65) Prior Publication Data

US 2014/0092202 A1    Apr. 3, 2014

(51) Int. Cl.
   *G06Q 10/10* (2012.01)
(52) U.S. Cl.
   USPC .......................................... 705/7.19

(58) Field of Classification Search
   USPC .............. 705/7.19, 7.24, 7.37; 370/236
   See application file for complete search history.

(56) References Cited

U.S. PATENT DOCUMENTS

| | | | |
|---|---|---|---|
| 2002/0157103 A1* | 10/2002 | Song et al. | 725/97 |
| 2005/0197877 A1* | 9/2005 | Kalinoski | 705/8 |
| 2008/0267161 A1* | 10/2008 | Bertrand et al. | 370/347 |
| 2013/0336126 A1* | 12/2013 | Vasseur et al. | 370/236 |
| 2014/0229219 A1* | 8/2014 | Hiller et al. | 705/7.19 |

* cited by examiner

*Primary Examiner* — Mohammad Islam
(74) *Attorney, Agent, or Firm* — Maldjian Law Group LLC; John Maldjian; Alexander D. Walter

(57) ABSTRACT

The present invention is directed to mitigating peak traffic in a multimedia conference. In one aspect, one or more requests for starting a first type of conference over the network are received. Thereafter, a second type of conference is started based on predefined parameters, wherein the second type of conference consumes lower bandwidth than the first type of conference.

6 Claims, 4 Drawing Sheets

MITIGATING PEAK TRAFFIC TIMES IN A MULTIMEDIA CONFERENCE

BACKGROUND

1. Field of the Invention

Embodiments of the present invention generally relate to multimedia conferencing. More specifically, an exemplary embodiment of the invention is directed toward bandwidth management in multimedia conferencing.

2. Description of Related Art

The use of video conferencing, which allows remote parties to both see and hear one another, is becoming increasingly popular. In particular, such applications facilitate remote communication by providing a visual image of one or more conference participants. Accordingly, video conferencing allows parties to communicate audibly and visibly, without requiring lengthy and expensive travel.

Video or audio conferencing systems are usually employed for setting up virtual conferences. Typically, participants join at a specified time for the conference by connecting to the conferencing systems. The conferencing systems may therefore have to handle multiple conferences simultaneously or sequentially.

Generally, most conferences are scheduled to start exactly on the hour and to last exactly one hour, while some other conferences start on the half hour and go for half an hour. For example, a conference may run from 10:00 AM to 11:00 AM or from 10:30 AM to 11:00 AM. Sometime, some participants may tend to arrive early for conferences, and some may tend to stay late after conferences. For example, the participants may arrive at 9:55 AM for a call scheduled from 10:00 AM to 11:00 AM, and may leave at 11:05 AM. Moreover, a next conference may be scheduled to start at the end time of a previous conference. This can result in a short-term peak traffic surge around those times that can drastically increase the usage of both ports and bandwidth of the conferencing system and/or a physical location that houses a participant or components of the conferencing system.

It might appear that this problem can be solved by good manners, strict enforcement of conference boundary times, and so forth. For example, some systems show only a still image before the start time of the conference, and then switch at the start time to moving images. However, this approach may sometimes deprive the participants of some useful information (for example, a video that is freely available). Moreover, the participants may forget or decline to implement this technique.

For the reasons set forth above, there is a need for a method and system capable of automatically allocating bandwidth across several conferences or communication links.

SUMMARY

Embodiments in accordance with the present invention are directed to mitigating peak-time traffic in multimedia conferences. According to the present invention, bandwidth available for a conference is automatically accessed and allocated equitably across several conferences when required.

In one embodiment, a method for managing bandwidth in a network is disclosed. The method comprises receiving at least one request for starting a first type of conference over the network. Thereafter, starting a second type of conference for the at least one request may be based on one or more predefined parameters. The second type of conference consumes lower bandwidth than the first type of conference. For example, the second type of conference may be an audio conference that is started instead of a first type of conference that may be a video conference.

Another embodiment in accordance with the present invention also discloses a method for managing bandwidth in a network. The method comprises monitoring one or more parameters while a first type of conference is in progress over the network. Further, replacing the first type of conference with a second type of conference may be based on the one or more predefined parameters. The second type of conference consumes lower network bandwidth than the first type of conference. For example, the first type of conference may be a video conference that is replaced after a scheduled end time to the second type of conference that may be an audio conference.

Another embodiment in accordance with the present invention discloses a system for managing bandwidth in a network. The system comprises a plurality of endpoints for transmitting at least one request for starting a first type of conference, and a conference bridge. The conference bridge is configured to receive the at least one request for starting the first type of conference, and start a second type of conference for the at least one request based on one or more predefined parameters. The second type of conference consumes lower network bandwidth than the first type of conference.

Another embodiment in accordance with the present invention discloses a method to manage bandwidth in a network, the method including: managing, by a processor, a first electronic conference between a first scheduled start time and a first scheduled end time, wherein the first electronic conference is configured to use a first bandwidth resource; storing, in a memory, a request for a second electronic conference between a second scheduled start time and a second scheduled end time, wherein the second scheduled start time is not earlier than the first scheduled end time, and wherein the second electronic conference is configured to use the first bandwidth resource; receiving a request to start the second electronic conference before the first scheduled end time; establishing, by a processor, usage of a second bandwidth resource configured to be used by the second electronic conference during a time interval from receipt of the request to start the second electronic conference to the first scheduled end time, wherein the second bandwidth resource consumes less bandwidth than the first bandwidth resource; and transferring the second electronic conference from the second bandwidth resource to the first bandwidth resource at the first scheduled end time.

Another embodiment in accordance with the present invention discloses a method to manage bandwidth in a network, the method including: managing, by a processor, a first electronic conference between a first scheduled start time and a first scheduled end time, wherein the first electronic conference is configured to use a first bandwidth resource; storing, in a memory, a request for a second electronic conference between a second scheduled start time and a second scheduled end time, wherein the second scheduled start time is not earlier than the first scheduled end time, and wherein the second electronic conference is configured to use the first bandwidth resource; receiving a request to continue the first electronic conference beyond the first scheduled end time; receiving a request to start the second electronic conference earlier than an actual end time of the first electronic conference, wherein the requested start time of the second electronic conference is no earlier than the second scheduled start time; establishing, by a processor, usage of a second bandwidth resource configured to be used by the first electronic conference after receipt of the request to start the second electronic conference, wherein the second bandwidth resource consumes less bandwidth than the first bandwidth resource; transferring the first electronic conference from the first bandwidth resource to the second bandwidth resource; and establishing the second electronic conference by use of the first bandwidth resource.

Another embodiment in accordance with the present invention discloses system to manage bandwidth in a network, the system including: a processor configured to manage a first electronic conference between a first scheduled start time and a first scheduled end time, wherein the first electronic conference is configured to use a first bandwidth resource; a memory configured to store a request for a second electronic conference between a second scheduled start time and a second scheduled end time, wherein the second scheduled start time is not earlier than the first scheduled end time, and wherein the second electronic conference is configured to use the first bandwidth resource; a receiver configured to receive a request to start the second electronic conference before the first scheduled end time; a processor configured to establish usage of a second bandwidth resource configured to be used by the second electronic conference during a time interval from receipt of the request to start the second electronic conference to the first scheduled end time, wherein the second bandwidth resource consumes less bandwidth than the first bandwidth resource; and a processor configured transfer the second electronic conference from the second bandwidth resource to the first bandwidth resource at the first scheduled end time.

The present invention can provide a number of advantages depending on the conference system. First, the present invention can automatically select a lower bandwidth communication link to mitigate peak traffic. Second, the present invention can request more bandwidth when required and distribute it appropriately among conferences.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

The terms "determine", "calculate" and "compute," and variations thereof, as used herein, are used interchangeably and include any type of methodology, process, mathematical operation or technique.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
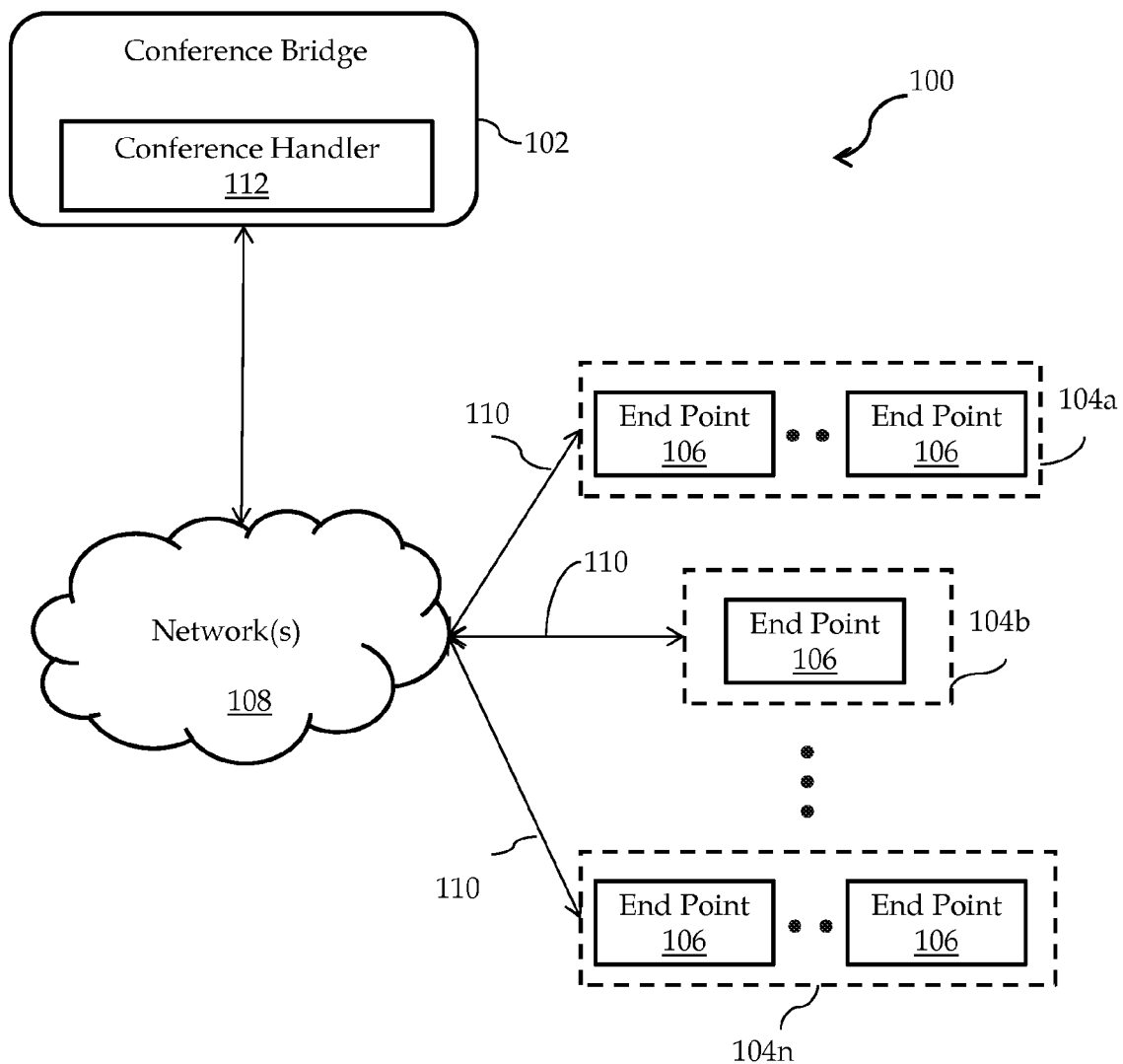
FIG. 1 is an exemplary conferencing system according to an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The invention will be described below in relation to a communications environment. Although well-suited for use with circuit-switched and packet-switched networks, the invention is not limited to use with any particular type of communication system or configuration of system elements and those skilled in the art will recognize that the disclosed techniques may be used in any application in which it is desirable to provide secure communications between endpoints. While the various endpoints described herein can be any communications device, such as a telephone, speakerphone, cellular phone, SIP-enabled endpoint, soft phone, PDA, wired or wireless communication device, video conferencing hardware/software, or in general any communications device that is capable of sending and/or receiving communications.

The exemplary systems and methods of this invention will also be described in relation to software, modules and associated hardware and network(s). However, to avoid unnecessarily obscuring the present invention, the following description emits well known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

FIG. 1 illustrates an exemplary conferencing system 100 according to an embodiment of the present invention. The conferencing system 100 includes a conference bridge 102 and sites 104a-n. Sites 104a-n include endpoints 106 that are connected to the conference bridge 102 via one or more network(s) 108. Examples of the network(s) 108 include, but are not limited to, a Local Area Network (LAN), a Wide Area Network (WAN), the Internet, Public Switched Telephone Network (PSTN), or other communication networks. In accordance with various embodiments, the conference bridge 102, network(s) 108, and endpoints 106 are Session Initiation Protocol (SIP) compatible and may include interfaces for various other protocols such as H.248, H.323, ISDN, E1/T1, and analog line or trunk. Examples of endpoints 106 include, but are not limited to, communications device, such as a telephone, speakerphone, cellular phone, SIP-enabled endpoint, soft phone, tablet, wired or wireless communication device, video conferencing hardware/software, or in general any communications device that is capable of sending and/or receiving communications.

The conference bridge 102 handles basic conference functionality such as setup, management, billing and termination. Cooperating with the conference bridge 102 is a conference handler 112. The conference handler 112 provides the functionality of handling conference calls among endpoints 106, in accordance with embodiments of the present invention. In various embodiments, the conference handler 112 may be implemented as hardware or a processor, software or computer instructions, firmware, or one or more combination of these. Although not shown, a person skilled in the art will appreciate that conference bridge 102 may include other components such as processor(s) and memory that may be required for the operation of the present invention.

Participants of conference calls use endpoints 106 to join a video or audio conference. In an embodiment, an endpoint 106 may be used by one or more participants. As shown, endpoints 106 may be available at sites 104a-n. In various embodiments, sites 104a-n may be distributed geographically or logically so as to use a same or different communication links 110 with the conference bridge 102 or among the endpoints 106.

Participants may join a conference call before a scheduled start time and leave the call after a scheduled end time. Another conference call may also be scheduled to start at the scheduled end time of the ongoing conference. Therefore, the actual call times of the ongoing conference may overlap the start or end time of the other scheduled conferences. In an embodiment, the communication links may have some predefined bandwidth allocation. Therefore, multiple conference calls using the same communication link at the same time may result in surge or peak usage of the bandwidth leading to reduced quality of communication. In accordance with an embodiment of the invention, the conference handler 112 automatically assesses and allocates the available the bandwidth based on the scheduled times of the conference. An exemplary scenario is explained in conjunction with the FIG. 2.

Figure 2:
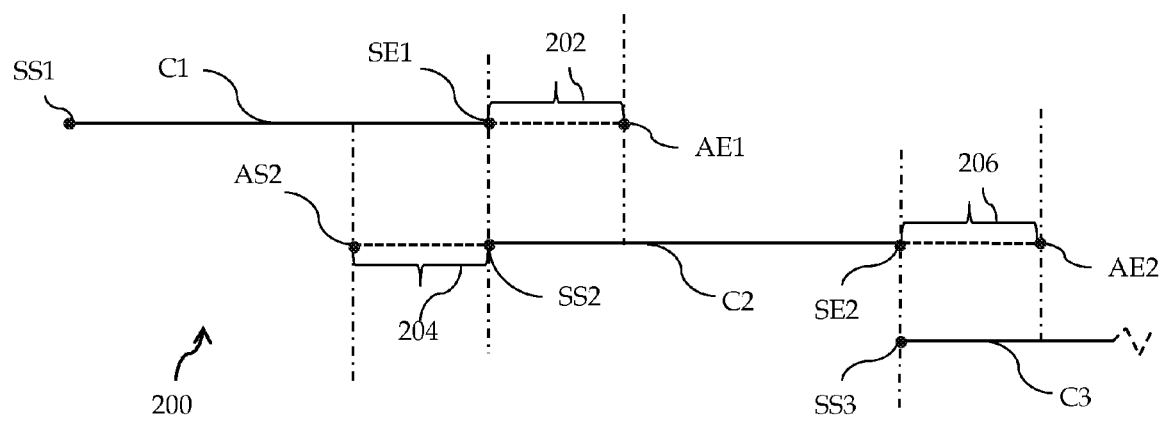
FIG. 2 depicts an exemplary conference call scenario according to an embodiment of the present invention.

FIG. 2 depicts an exemplary conference call scenario 200 according to an embodiment of the present invention. The scenario 200 includes timelines for a video conference C1, a video conference C2, and a video conference C3. The conference C1 has a scheduled start time SS1 and a scheduled end time SE1. Similarly, the conference C2 has a scheduled start time SS2 and a scheduled end time SE2, and the conference C3 has a scheduled start time SS3. The conferences C1, C2, and C3 are scheduled sequentially, therefore, SE1 (or scheduled end time of the conference C1) is the same as SS2 (or scheduled start time of the conference C2), and SE2 (or scheduled end time of the conference C2) is same as SS3 (or scheduled start time of the conference C3). A person skilled in the art will appreciate that scenario 200 is an exemplary case selected for brevity and simplicity of explanation, and any other start or end condition, or conference type (e.g., audio or video) may occur in real world conferencing environment.

Each or some participants of the conference C1 may exceed the scheduled duration and conclude at an actual end time AE1. This extra time duration may be required to complete any ongoing discussion. Therefore, the conferences C1 and C2 overlap over a first time duration 202 from SE1 (or SS2) to AE1. In a similar case, each or some participants of the conference C2 may join at an actual time AS2 that is before SS2. Therefore, the conferences C1 and C2 may overlap over a second time duration 204 from AS2 to SE1 (or SS2). Similarly, the conferences C2 and C3 may overlap over a third time duration 206 from SS3 (or SE2) to AE2. This may result in peak traffic and bandwidth surge over the first time duration 202, the second time duration 204, and the third time duration 206.

The conference handler 112 automatically handles the bandwidth allocation at the overlap durations by appropriately moving a first type of conference to a second type of conference. In an embodiment, the second type of conference consumes lower bandwidth than the first type of conference. For example, in case the first type of conference is a video conference, then the second type of conference may be an audio conference or may use any other lower bandwidth communication mechanism or codec. For example, in the scenario 200, the conference C2 may be enabled only as audio conference over the second time duration 204, while the conference C1 may be enabled as a video conference until the scheduled end time SE1. Further, the conference C1 may be moved from the video conference to an audio conference over first time duration 202, while the conference C2 is moved from the audio conference to the video conference. Similar, scenario is possible at the scheduled end time of the conference C2 and the scheduled start time of the conference C3 over the third time duration 206. Therefore, bandwidth requirements for the overlap durations are reduced. The first, second, and third time durations 202, 204, and 206 over which the conference handler 112 manages the bandwidth are hereinafter referred to as green rooms 202, 204, and 206 respectively, or generically as green room(s). Assuming that a video conference requires a bandwidth of 10 mb/s, and an audio conference required a bandwidth of 1 mb/s. Then the peak bandwidth requirement is reduced from 20 mb/s (i.e., from the video conference C1 and C2) to 11 mb/s (i.e., from the video conference C1 and audio conference C2). In an embodiment, the conference handler 112 decides to move a conference to a green room based on multiple parameters. The parameters and functioning of the present invention is explained in detail in conjunction with FIG. 3.

Scheduled start times and/or scheduled end times may be determined from a scheduling system such as a group calendaring system. Embodiments in accordance with the present invention may receive hints from the group calendaring system, know or determine the expected start/end of a meeting, and use that information to set up a green room. The green room may also be useful when incorporated into more elaborate reservation systems that attempt to ensure that available bandwidth is guaranteed and then allotted equitably among scheduled meetings. However, it should be understood that "reservation" in this context may not necessarily include a guarantee of service quality, and therefore of bandwidth availability. Social engineering may also be used to manage users' expectations and behavior, including by informing users of the existence, purpose, and/or capabilities of the green rooms.

The pre-conference green room 204 may be made virtual by allowing a person to enter the green room 204, establish his presence, terminate that connection, and then wait until being notified (e.g., by phone call, IM, text message, etc.) to re-enter the active conference. The idea can be extended to allowing the moderator to designate a conference start time to be "flexible" allowing participants to use the call back facility to employ available resources efficiently.

Figure 3A:
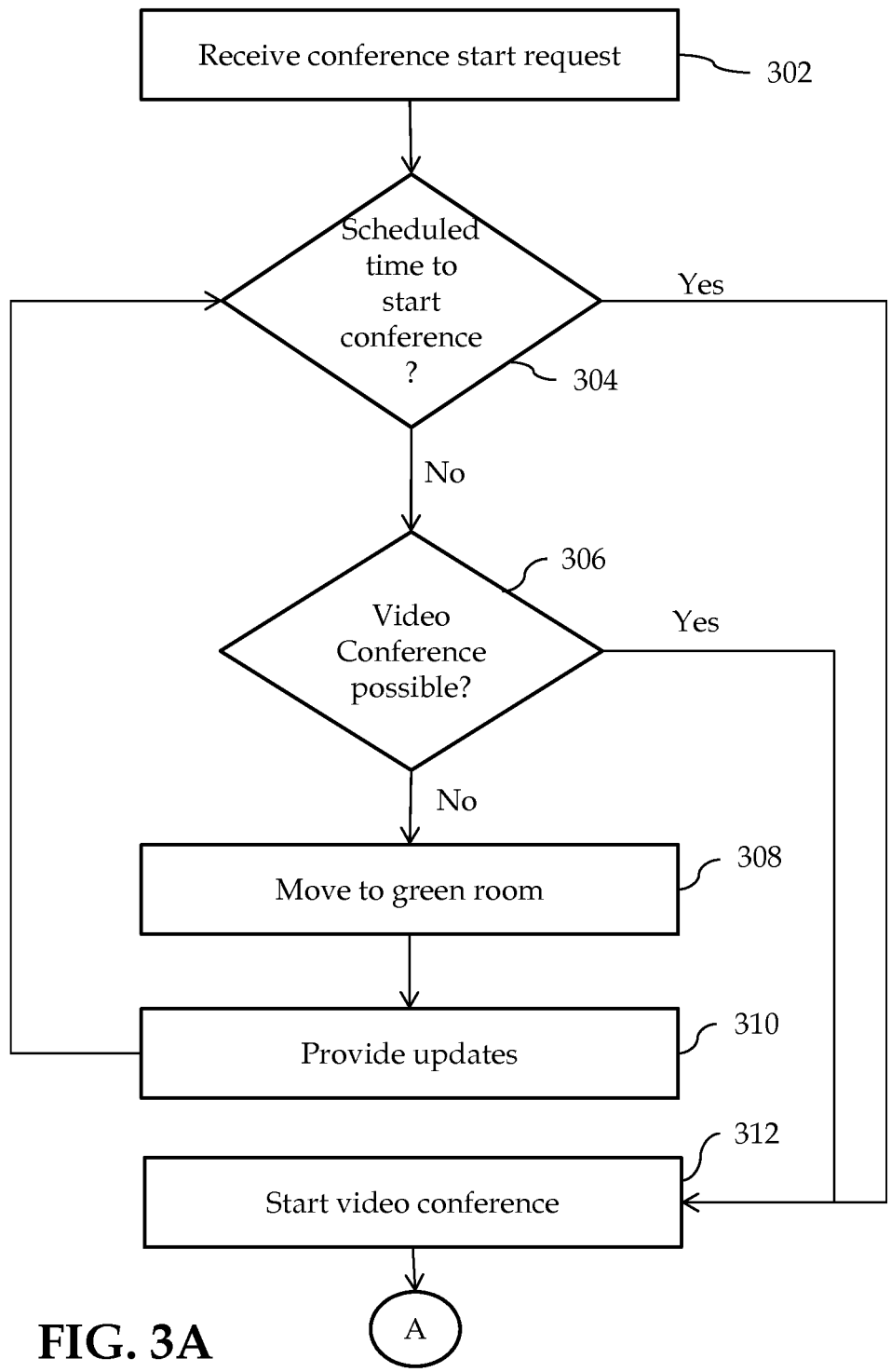
FIGS. 3A and 3B are flow diagrams for mitigating peak traffic times according to an embodiment of the present invention.
Figure 3B:
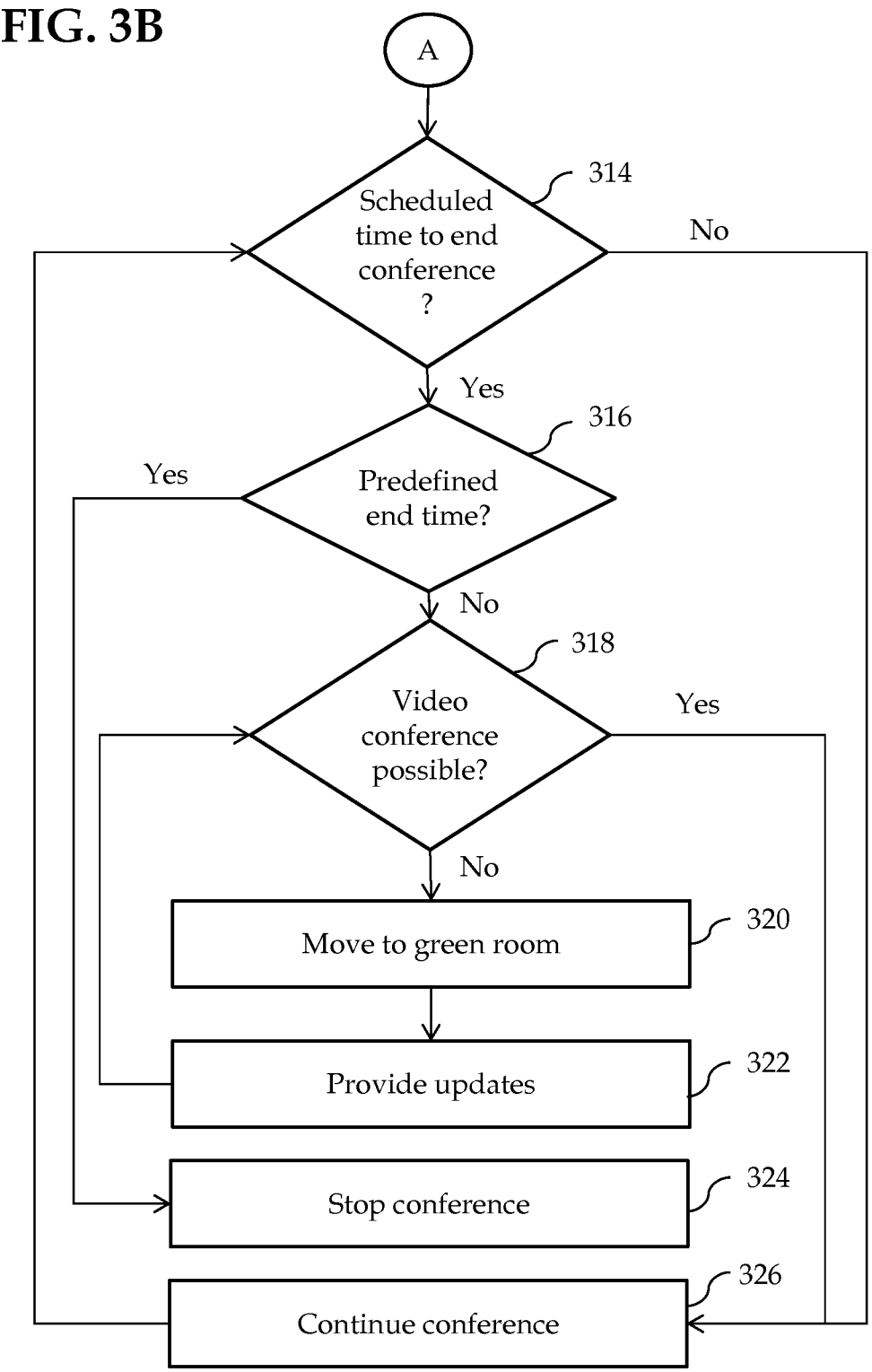

FIGS. 3A and 3B are flow diagrams for mitigating peak traffic times according to an embodiment of the present invention. The flow diagrams of FIGS. 3A and 3B are explained in conjunction with the exemplary scenario of FIG. 2. Further, the first type of conference is hereinafter referred to as a video conference and the second type of conference is hereinafter referred to as an audio conference for the sake of simplicity and brevity. However, a person skilled in the art will appreciate that this does not limit the present invention to only video or audio conferences, and other type of conferences or communications are also possible.

In step 302, the conference handler 112 receives requests from one or more participants for starting a video conference C2. In an embodiment, the requests may include the caller identification, conference passcode, joining time and the like. The conference handler 112 may further acknowledge the joining of the participants in the conference. In an embodiment, the acknowledgement may be provided though audio announcement. Thereafter, in step 304, the conference handler 112 determines whether the joining time of the participants is before, at, or after the scheduled start time SS2 for the video conference C2. In an embodiment, the conference handler 112 monitors the predefined parameters to determine the current and scheduled start or end times for the conferences.

In case the joining time is at or after SS2 then the process continues to step 312. In step 312, the participants are joined to the video conference C2. Thereafter, the process continues to step 314. Otherwise, if the joining time is before SS2 (i.e., the joining time is AS2), then the process continues to step 306. In step 306, the conference handler 112 determines whether a video conferencing is possible based on one or more predefined parameters. In an embodiment, the predefined parameters include, but are not limited to, scheduled start times of one or more conferences, scheduled end times of the one or more conferences, number of participants in the one or more conferences, number of participants joined to the one or more conferences, available bandwidth in the network, available ports for communication, estimated bandwidth in the network, estimated ports for communication, a priority rating for each of the one or more conferences, presence of key persons in the conference, sites 104 for the endpoints 106, or conferencing capabilities of one or more endpoints. In an embodiment, the conferencing capabilities at the endpoints 106 may include video resolution, audio bit-rate, type of the network 108, or other communication capabilities of the endpoints 106, the network 108, the communication links 110, or the conference bridge 102.

In case the conference handler 112 determines that video conferencing is possible then the process continues to step 312, where video conference C2 is enabled. Otherwise, the process continues to step 308. In step 308, the conference handler 112 starts the audio conference C2 for the participants over the green room 204. As explained in conjunction with FIG. 2, the green room 204 may continue from AS2 until SS2. In an embodiment, the low bandwidth communication may include audio, text, or other low bandwidth communication techniques such as reducing the number of simultaneous speakers. In an embodiment, the conference handler 112 may provide additional tasks for the participants over the green room 204. For example, in an audio context, the participants may join the conference with additional information (beyond that offered by the caller identification), may offer a voice sample, acknowledge receipt of conference materials, or select an appropriate waiting music. In a video context, the participants may provide still pictures to be used when they are not actively transmitting, or select a display picture from a variety of still pictures, and so forth.

In step 310, the conference handler 112 provides updates on status of the audio conference C2 during green room 204. In various embodiments, the updates may include information such as total number of participants, number of participants joined, time remaining before the scheduled start time, duration of the video conference C2, agenda of the conference, and so forth. Timer status may also be provided to participants in the conference and/or participants waiting in a green room. Timer status may be in the form of the current time compared to: scheduled end of conference C1; actual start time of conference C2; scheduled start time of conference C2; time of entrance into a green room; and so forth. Timer status may be in the form of a visual indicator (e.g., a digital clock or countdown display; a red light; etc.) or an audible indicator such as a beep for a conference that is running too long.

Thereafter, the process continues to step 304, where a determination is made to move from the green room 204 and replace the second type of conference with the first type of conference. Therefore, the peak traffic is mitigated for the conference. For example, in case the video conference C1 was ongoing at the time AS2, then the quality of the video conference C1 is maintained, while the participants of video conference C2 can continue their discussion over a low bandwidth connection. In an embodiment, video conference may be enabled for intra-site communication, while only audio is enabled for inter-site communication. For example, the participant joining from the endpoints 106 of the site 104a may be provided video conference with each other, while only audio conference is enabled for communication with the endpoint 106 at the site 104b. As a result, the bandwidth consumption on inter-site communication may be reduced. In an embodiment, movement from the green room 204 to complete video conference may be made between the actual start time AS2 and the schedule start time SS2, or after SS2 based on the predefined parameters. For example, if a key person such as a moderator of the call has arrived before SS2, then a video conference may be started before SS2. A person skilled in the art will appreciate that various other rules or parameters may be considered to decide moving from green room 204 to video conference. In an embodiment, the conference handler 112 may request for additional bandwidth so that both the video conferences C2 and C1 can be started, and move to the green room 204 only when necessary and useful.

In step 314, the conference handler 112 determines whether a current or present time is the scheduled time to end SE2 for the video conference C2. In an embodiment, the conference handler 112 monitors the predefined parameters while the video conference C2 is in progress to determine the current and scheduled times for the conferences. In case—the current time is before SE2 then the process continues to step 326. Otherwise, in step 316, the conference handler 112 determines whether the video conference C2 reached an end time. In case—the video conference C2 has reached the end time, then the process continues to step 324, where the conference is stopped. In an embodiment, the ports or the communication link 110 between the conference bridge 102 and the endpoints 106 are closed, in step 324. The end time may be the actual end time AE2 or a time after the scheduled end time SE2 for the conference C2.

Otherwise, the process continues to step 318. In step 318, the conference handler 112 determines whether a video conferencing is possible based on the predefined parameters. In case—the call determines that video conferencing is possible then the process continues to step 326, where the video conference C2 is continued. Otherwise, the process continues to step 320. In step 320, the conference handler 112 replaces the video conference C2 with audio conference C2 over the green room 206. As explained in conjunction with FIG. 2, the green room 206 may continue from SS3 until AE2. In an embodiment, the low bandwidth communication may include audio, text, or other low bandwidth communication techniques such as reducing the number of simultaneous speakers. In an embodiment, the still pictures of the participants may be displayed over the green room 206.

In step 322, the conference handler 112 provides updates on the status of the audio conference C2 during green room 206. In various embodiments, the updates may include information such as total number of participants, number of participants joined, extra time after scheduled end time, time remaining before stopping the conference, and so forth. Thereafter, the process continues to step 318, where a determination is made to move back from the green room 206 and re-start the video conference C2. Therefore, the peak traffic at the end of the conference C2 and start of video conference C3 is mitigated. For example, in case the video conference C2 was ongoing at the time SS3 (i.e., the scheduled start time of the conference C3), then the quality of C3 is maintained, while the participants of C2 can continue their discussion over a low bandwidth connection. In an embodiment, a video conference may be enabled for intra-site communication, while only an audio conference is enabled for inter-site communication. For example, the participant joining from the endpoints 106 of the site 104a may be provided video conference with each other, while only audio conference is enabled for communication with the endpoint 106 at the site 104b. As a result, the bandwidth consumption on inter-site communication may be reduced. In an embodiment, movement from complete video conference to the green room 206 may be made between the scheduled end time SE2 and the actual end time AE2 based on the predefined parameters. For example, if a key person such as a moderator of the conference C3 has not arrived at SS3, then the video conference for conference C2 may continue beyond SE2. A person skilled in the art will appreciate that various other rules or parameters may be considered to decide moving from video conference to a green room.

In an embodiment, the conference handler 112 enables a participant to enter a conference over a green room period, establish his presence, terminate the connection, and then wait until he is notified to re-enter the complete video conference. In an embodiment, the participant may be notified by a phone call, an instant message, an SMS, an email, or by any other audio, visual, or textual notification. In another embodiment, the conference handler 112 enables a key participant such as a moderator to allow other participants to avail call back facility to conserve bandwidth.

A system in accordance with an embodiment of the present invention may take a current load factor into account as it sets up a green room. If bandwidth is available, a pre-video green room can use video; if not, it can use audio only. Note that a system can incorporate all relevant information to make these decisions reasonably, while we cannot count on cooperative users to have all the information available to them. Furthermore, a system may automatically allocate pre-meeting bandwidth across several meetings according to the priorities of the various users and meetings and in light of the current and projected availability of resources such as bandwidth and ports.

The embodiments described herein may be applicable to web conferencing, chat rooms, e-mail, text messages, tweets and the like. In these cases, expensive operations (e.g., expensive bandwidth) are downgraded to less expensive operations before and after the conference body.

A person skilled in the art will appreciate that while the embodiments of the present invention have been explained in the context of video conference, however this invention may be implemented in context of other communication domains such as web conferencing, chat rooms, e-mail, text messages, tweets and the like, where network bandwidth management may be required.

The exemplary systems and methods of this invention have been described in relation to an audio/visual conference. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\ or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in a claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method to manage bandwidth in a network, the method comprising:

managing, by a processor, a first electronic conference between a first scheduled start time and a first scheduled end time, wherein the first electronic conference is configured to use a first bandwidth resource;

storing, in a memory, a request for a second electronic conference between a second scheduled start time and a second scheduled end time, wherein the second scheduled start time is not earlier than the first scheduled end time, and wherein the second electronic conference is configured to use the first bandwidth resource;

receiving a request to start the second electronic conference before the first scheduled end time;

establishing, by a processor based upon one or more predefined parameters, usage of a second bandwidth resource configured to be used by the second electronic conference during a time interval from receipt of the request to start the second electronic conference to the first scheduled end time, wherein the second bandwidth resource consumes less bandwidth than the first bandwidth resource; and transferring the second electronic conference from the second bandwidth resource to the first bandwidth resource at the first scheduled end time.

2. The method of claim 1, wherein the second bandwidth resource consumes less bandwidth than the first bandwidth resource by omitting a video media stream from the second electronic conference.

3. The method of claim 1, wherein the second bandwidth resource consumes less bandwidth than the first bandwidth resource by degrading a video media stream from the second electronic conference.

4. The method of claim 1, wherein the second bandwidth resource consumes less bandwidth than the first bandwidth resource by assigning a lower service priority to the second electronic conference.

5. A method to manage bandwidth in a network, the method comprising:

managing, by a processor, a first electronic conference between a first scheduled start time and a first scheduled end time, wherein the first electronic conference is configured to use a first bandwidth resource;

storing, in a memory, a request for a second electronic conference between a second scheduled start time and a second scheduled end time, wherein the second scheduled start time is not earlier than the first scheduled end time, and wherein the second electronic conference is configured to use the first bandwidth resource;

receiving a request to continue the first electronic conference beyond the first scheduled end time;

receiving a request to start the second electronic conference earlier than an actual end time of the first electronic conference, wherein the requested start time of the second electronic conference is no earlier than the second scheduled start time;

establishing, by a processor based upon one or more predefined parameters, usage of a second bandwidth resource configured to be used by the first electronic conference after receipt of the request to start the second electronic conference, wherein the second bandwidth resource consumes less bandwidth than the first bandwidth resource;

transferring the first electronic conference from the first bandwidth resource to the second bandwidth resource; and establishing the second electronic conference by use of the first bandwidth resource.

6. A system to manage bandwidth in a network, the system comprising:

a processor configured to manage a first electronic conference between a first scheduled start time and a first scheduled end time, wherein the first electronic conference is configured to use a first bandwidth resource;

a memory configured to store a request for a second electronic conference between a second scheduled start time and a second scheduled end time, wherein the second scheduled start time is not earlier than the first scheduled end time, and wherein the second electronic conference is configured to use the first bandwidth resource;

a receiver configured to receive a request to start the second electronic conference before the first scheduled end time;

a processor configured to establish, based upon one or more predefined parameters, usage of a second bandwidth resource configured to be used by the second electronic conference during a time interval from receipt of the request to start the second electronic conference to the first scheduled end time, wherein the second bandwidth resource consumes less bandwidth than the first bandwidth resource; and a processor configured transfer the second electronic conference from the second bandwidth resource to the first bandwidth resource at the first scheduled end time.

* * * * *